(12) United States Patent
Socol et al.

(10) Patent No.: US 9,413,427 B2
(45) Date of Patent: Aug. 9, 2016

(54) EMULATION OF MULTIPLE DEVICES IN AN NFC DEVICE

(71) Applicant: ST-Ericsson SA, Plan-les-Ouates (CH)

(72) Inventors: Constantin Socol, Good Luck Garden (SG); Sorin Adrian Badiu, Singapore (SG); Frederic Goffin, Singapore (SG)

(73) Assignee: ST-ERICSSON SA, Plan-les-Ouates (CH)

( * ) Notice: Subject to any disclaimer, the term of this patent is extended or adjusted under 35 U.S.C. 154(b) by 0 days.

(21) Appl. No.: 14/405,837

(22) PCT Filed: Jun. 28, 2013

(86) PCT No.: PCT/EP2013/063698
§ 371 (c)(1),
(2) Date: Dec. 5, 2014

(87) PCT Pub. No.: WO2014/001535
PCT Pub. Date: Jan. 3, 2014

(65) Prior Publication Data
US 2015/0162954 A1    Jun. 11, 2015

Related U.S. Application Data

(60) Provisional application No. 61/668,197, filed on Jul. 5, 2012.

(30) Foreign Application Priority Data

Jun. 28, 2012 (EP) .................................... 12174082

(51) Int. Cl.
*H04B 5/00* (2006.01)
*H04W 4/00* (2009.01)

(52) U.S. Cl.
CPC ............. *H04B 5/0025* (2013.01); *H04W 4/008* (2013.01)

(58) Field of Classification Search
CPC .......... G06K 19/0725; G06K 7/10019; G06K 19/0723; G06K 19/07749; G06K 19/0724

USPC ............. 455/41.1, 588; 379/166, 211.05, 379/357.01, 357.02, 433.09
See application file for complete search history.

(56) References Cited

U.S. PATENT DOCUMENTS 8,670,711 B2 * 3/2014 Fine et al. ................ 455/41.1
2010/0056053 A1   3/2010 Breitfuss et al.
(Continued)

FOREIGN PATENT DOCUMENTS

EP    2 239 926 A1    10/2010

OTHER PUBLICATIONS

International Search Report issued in corresponding International application No. PCT/EP2013/063698, date of mailing Sep. 2, 2013.
Extended European Search Report issued in corresponding European application No. EP 12 17 4082, date of completion of search Nov. 27, 2012.

(Continued)

*Primary Examiner* — Nay A Maung
*Assistant Examiner* — Angelica M Perez
(74) *Attorney, Agent, or Firm* — Patent Portfolio Builders PLLC

(57) ABSTRACT

A method in a signal generating unit, SGU, generates a signal to be used in a Near-Field Communication, NFC, reader. The SGU is configured to communicate with an NFC controller unit, NFC-CU, and with an NFC-Wired Interface unit, NFC-WIU. The NFC-CU and the SGU are included in an NFC device, and the NFC-WIU is connected to the NFC device. The SGU receives a first signal that includes data encoding information indicating a first unique identifier supported by the NFC-CU, from the NFC-CU, and a second signal that includes data encoding information indicating a second unique identifier supported by the NFC-WIU, from the NFC-WIU. The SGU generates a third signal to be used in the NFC reader to generate a collision sequence, based on the first signal and the second signal. An SGU configured to perform the method, and a NFC device that includes the SGU are also provided.

11 Claims, 5 Drawing Sheets

(56) References Cited

U.S. PATENT DOCUMENTS

| | | | |
|---|---|---|---|
| 2010/0227553 A1* | 9/2010 | Charrat | G06Q 20/341 |
| | | | 455/41.1 |
| 2012/0034868 A1* | 2/2012 | Fine et al. | 455/41.1 |
| 2012/0092137 A1* | 4/2012 | Buscemi | G06K 7/10237 |
| | | | 340/10.51 |

OTHER PUBLICATIONS

Langer, Josef et al., "NFC-Technologie" in "Anwendungen und Technik von Near Field Communication (NFC)," Jan. 1, 2010, Springer Berlin Heidelberg, Berlin, Germany, XP055020102; ISBN: 978-3-64-205497-6, pp. 87-108, DOI: 10.1007/978-3-642-05497-6.

* cited by examiner

EMULATION OF MULTIPLE DEVICES IN AN NFC DEVICE

TECHNICAL FIELD

Embodiments herein relate to emulation of multiple devices in an NFC device. In particular, embodiments herein relate to a signal generating unit for generating a signal to be used in a NFC reader, which signal generating unit is comprised in an NFC device.

BACKGROUND

Near-Field Communication (NFC) is a short-range wireless technology, normally operating at a radio frequency (RF) of 13.56 MHz using ISO/IEC 18000-3 air interfaces. NFC uses magnetic induction between two loop antennas that are located within in proximity of each other's RF fields, i.e. within each other's near fields, to effectively form an air-core transformer. This inductive coupling allows an exchange of data between two NFC capable devices, each comprising a loop antenna or similar.

In particular, the standards ISO14443 and ISO18092 provide modulation and communication protocols which may be used in the exchange of data between the two NFC capable devices.

The two NFC capable devices are usually an NFC reader and a NFC device. In a passive communication mode, the NFC reader may modulate and actively generate an RF field, which may power and provide energy to the NFC device. The NFC device may respond by modulating the existing RF field generated by the NFC reader. In an active communication mode, both the NFC reader and the NFC device may communicate by alternately generating their own RF fields.

FIG. 1 depicts an NFC reader 200 and a NFC device 100. The NFC reader 200 comprise a NFC physical interface 210 connected to a loop antenna, and a NFC controller 220. The NFC device 100 comprises a NFC physical interface 110 connected to a loop antenna, a NFC controller 120 and a processing unit 140. The NFC controller 120 further comprises a NFC controller unit (CLF) 121 and a Software Controlled Multiplexer (SW Ctrl MUX) 122.

In this exemplary case, while only one NFC device 100 is physically present within the RF field of the NFC reader 200, three independent cards/devices are actually emulated by the NFC device 100.

Namely, two Proximity Integrated Circuit Card (PICC) cards/devices are currently emulated by the NFC controller 120 based on Universal Integrated Circuit Cards (UICC), i.e. UICC1 151 and UICC2 152, each thus corresponding to an emulated card/device with a Unique Identifier (UID), e.g. 121A, 121B, . . . , 121 N, in the NFC controller unit 121.

Also, a NFC-WI device 300 configured with a Near-Field Communication Wired Interface (NFC-WI), as described in the ECMA-373 standard, is connected to the NFC controller 120. The NFC-WI device 300 has an independent, standalone functionality for card/device emulation being able to communicate with the NFC physical interface 110, here, via the Software Controlled Multiplexer (SW Ctrl MUX) 122.

However, the independent, standalone functionality for card/device emulation in the NFC-WI device 300 may cause problems when the NFC Controller unit (CLF) 121 in the NFC device 100, as described above, also supports multiple card emulations, such as, for example, for UICC1 151 and UICC2 152. This is because the multiple card/device emulations in the NFC Controller unit (CLF) 121 may use protocols, such as, for example, ISO14443-4, ISO18092, etc., that are based on the ISO14443A standard, i.e. that is the same as the ECMA-373 standard. That is, both the NFC Controller unit (CLF) 121 and the NFC-WI device 300 will require, want to respond and perform according to the polling, anti-collision and selection procedure as defined in the ISO14443-3 specification.

A problem with this is that it is impossible, in a standard implementation as described above, to send multiple responses to a polling command—as it would happen in case of separate physical devices, i.e. not emulated—to make the NFC reader 200 aware of the presence of multiple devices, as further described below.

FIG. 2 shows a signalling diagram between the NFC device 100 and the NFC reader 200 performing a polling, anti-collision and selection procedure.

As shown in Actions 201-202, when separate physical NFC devices 100 of the same technology are present in front of a NFC reader 200, responses to a polling command from each separate physical NFC device 100 will create collisions in the NFC reader 200 making the NFC reader 200 aware of the presence of more than one separate physical NFC device 100. Thus, after an anti-collision and selection procedure as shown in Actions 203-206, the NFC reader 200 may deselect the NFC devices 100 one by one if e.g. each Application ID (AID) transmitted by each NFC device 100, e.g. 221A, 221B, . . . , 221N, is not matching the AID targeted by the NFC reader 200. An NFC device 100 may also be deselected if e.g. it does not support the desired protocol of the targeted AID. This is shown in Actions 207.

However, as mentioned above, an NFC Device 100 is only able to send one reply from any of the emulated PICCs or the NFC-WI device 300. Thus, the NFC reader 200 may thus not be aware of the NFC-WI device 300 or the multiple PICCs emulated by NFC device 100.

Consequently, the NFC reader 200 may restart the polling, anti-collision and selection procedure again. The NFC controller 120 may then e.g. use a different protocol or report another AID from an internal list in its response to the polling or anti-collision command to the NFC reader 200. Also, the NFC reader 200 may switch to polling in a different technology, switch to listen mode, or even switch off its RF field, since the NFC reader 200 is only aware of NFC devices 100 emulating one NFC device only which presently do not meet the targeted functionality.

Hence, since both the NFC Controller unit (CLF) 121 and the NFC-WI device 300 require and performs the polling, anti-collision and selection as defined in the ISO14443-3 specification and uses separate data paths 122A, 122B as shown in FIG. 1, only one of the NFC Controller unit (CLF) 121 and the NFC-WI device 300 will be able to respond to a particular polling or anti-collision command one at a time. This means alternate exposure of an emulated card/device based on the NFC Controller unit (CLF) 121 or an emulated card/device based on the NFC-WI device 300.

Consequently, the NFC reader 200 may thus only be aware of the presence of one of the emulated cards/devices in the NFC device 100 and may then e.g. switch to polling in a different technology, switch to listen mode, or even switch off its RF field, etc. Therefore, the NFC reader 200 may not be able to correctly parse all emulated cards/devices in the NFC device 100.

SUMMARY

It is an object of embodiments herein to enable an NFC reader to be aware of emulated NFC devices and connected NFC-WI devices in an NFC device present in the NFC readers RF-field.

According to a first aspect of embodiments herein, the object is achieved by a method in a signal generating unit for generating a signal to be used in a Near-Field Communication, NFC, reader. The signal generating unit is comprised in an NFC device and configured to communicate with an NFC controller unit and an NFC-Wired Interface unit. The NFC controller unit is comprised in the NFC device. The NFC-Wired Interface unit is connected to the NFC device. The signal generating unit receives a first signal from the NFC controller unit, which first signal comprises data encoding information indicating a first unique identifier that is supported by the NFC controller unit. Also, the signal generating unit receives a second signal from the NFC-Wired Interface unit, which second signal comprises data encoding information indicating a second unique identifier that is supported by the NFC-Wired Interface unit. Then, the signal generating unit generates a third signal based on the first and the second signal, which third signal is to be used in the NFC reader to generate a collision sequence.

According to a second aspect of embodiments herein, the object is achieved by a signal generating unit for generating a signal to be used in a Near-Field Communication, NFC, reader. The signal generating unit is comprised in an NFC device and configured to communicate with an NFC controller unit and an NFC-Wired interface unit. The NFC controller unit is comprised in the NFC device. The NFC-Wired Interface unit is connected to the NFC device. The signal generating unit being further configured to receive a first signal from the NFC controller unit, which first signal comprises data encoding information indicating a first unique identifier that is supported by the NFC controller unit. Also, the signal generating unit is configured to receive a second signal from the NFC-Wired Interface unit, which second signal comprises data encoding information indicating a second unique identifier that is supported by the NFC-Wired Interface unit. Then, the signal generating unit is further configured to generate a third signal based on the first and second signals, which third signal is to be used in the NFC reader to generate a collision sequence.

According to a third aspect of embodiments herein, the object is achieved by a Near-Field Communication, NFC, device configured to be connected to an NFC-Wired Interface unit. The NFC device comprises an NFC controller. The NFC controller comprises an NFC controller unit and a signal generating unit, as described above.

By receiving both signals from the NFC-Wired Interface unit and the NFC controller unit and creating a combined signal as described above, a collision sequence is enabled to be generated in the NFC reader for both an emulated NFC device in the NFC controller unit and the NFC-Wired Interface unit. Upon reception in the NFC reader, the NFC reader would thus be able to correctly parse an emulated NFC device and connected NFC-WI device in an NFC device that is present in the NFC readers RF-field. This enables the NFC reader to be aware of emulated NFC devices and connected NFC-WI devices in an NFC device present in the NFC readers RF-field.

BRIEF DESCRIPTION OF THE DRAWINGS

The above and other features and advantages of the embodiments will become readily apparent to those skilled in the art by the following detailed description of exemplary embodiments thereof with reference to the accompanying drawings, wherein.

DETAILED DESCRIPTION

Figure 1:
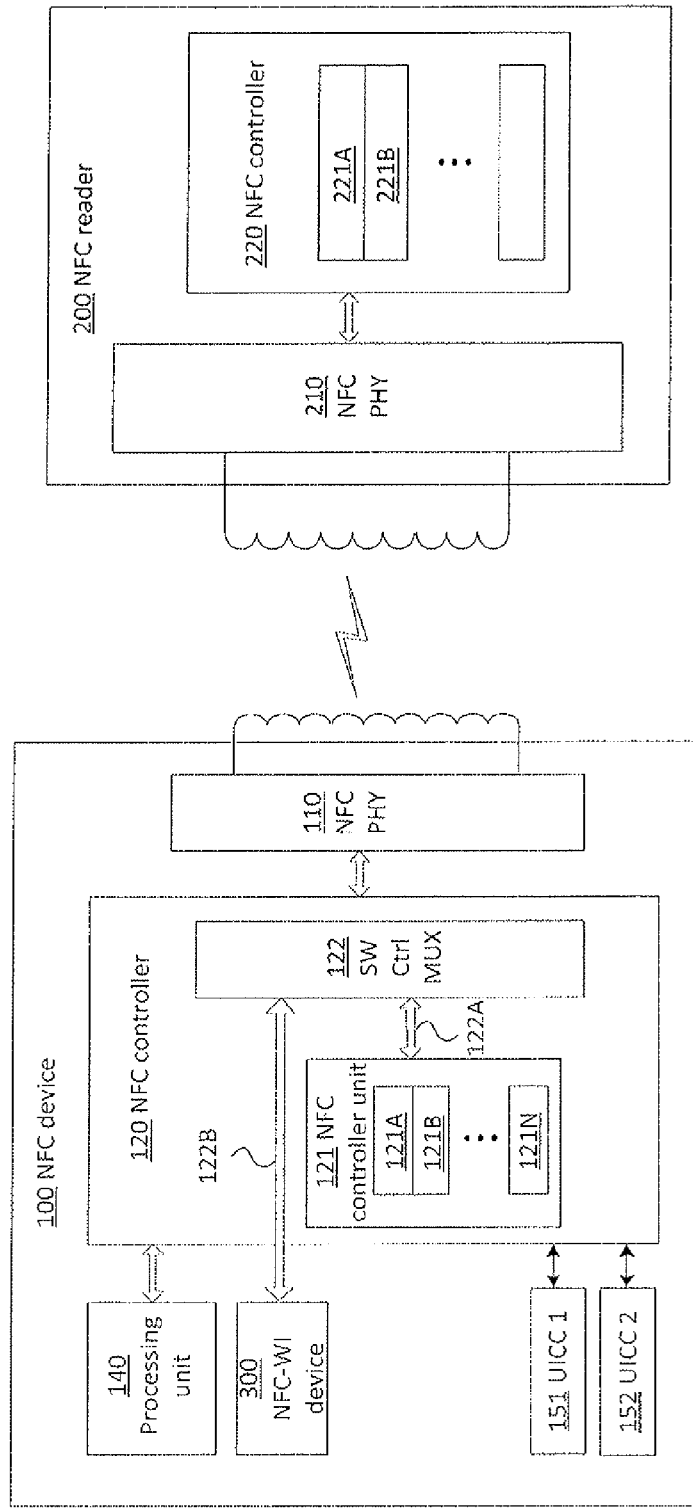
FIG. 1 is a schematic block diagram of an NFC device and an NFC reader according to prior art.
Figure 2:
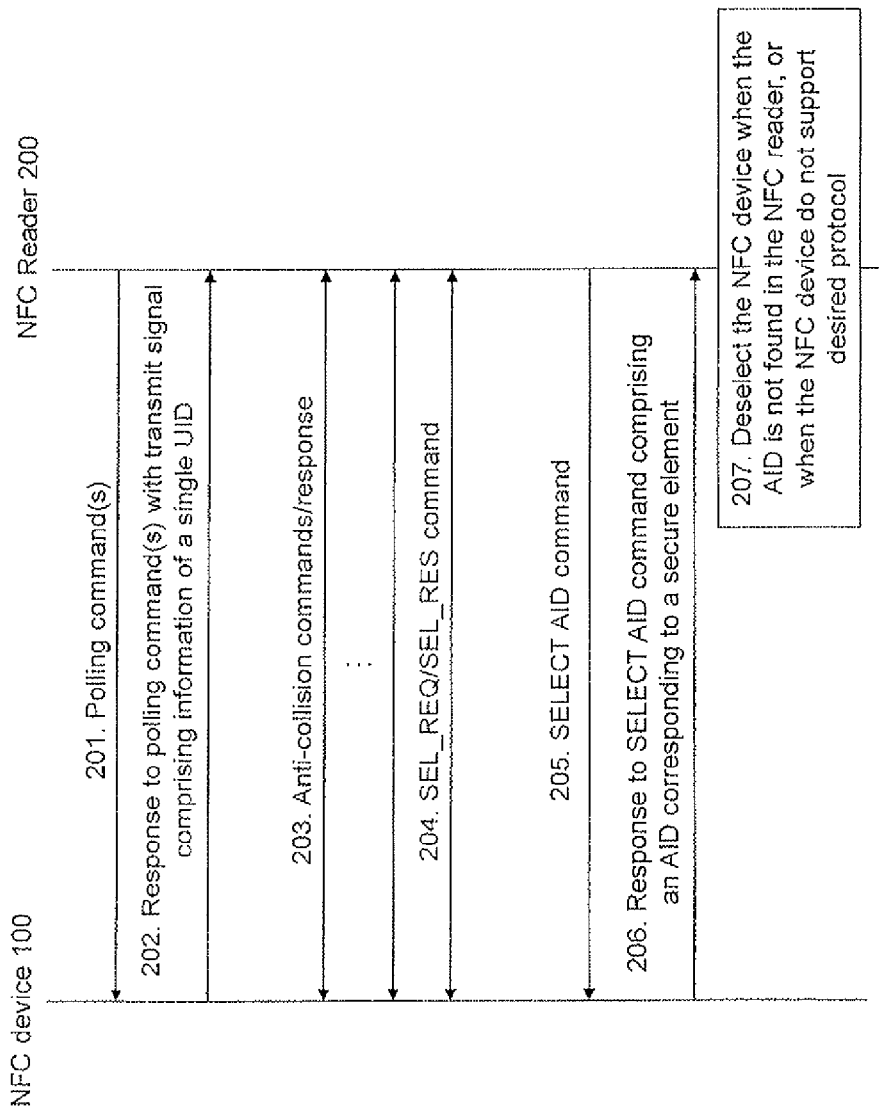
FIG. 2 is a signalling diagram between an NFC device and an NFC reader according to prior art.

The figures are schematic and simplified for clarity, and they merely show details which are essential to the understanding of the embodiments, while other details have been left out. Throughout, the same reference numerals are used for identical or corresponding parts or steps.

Figure 3:
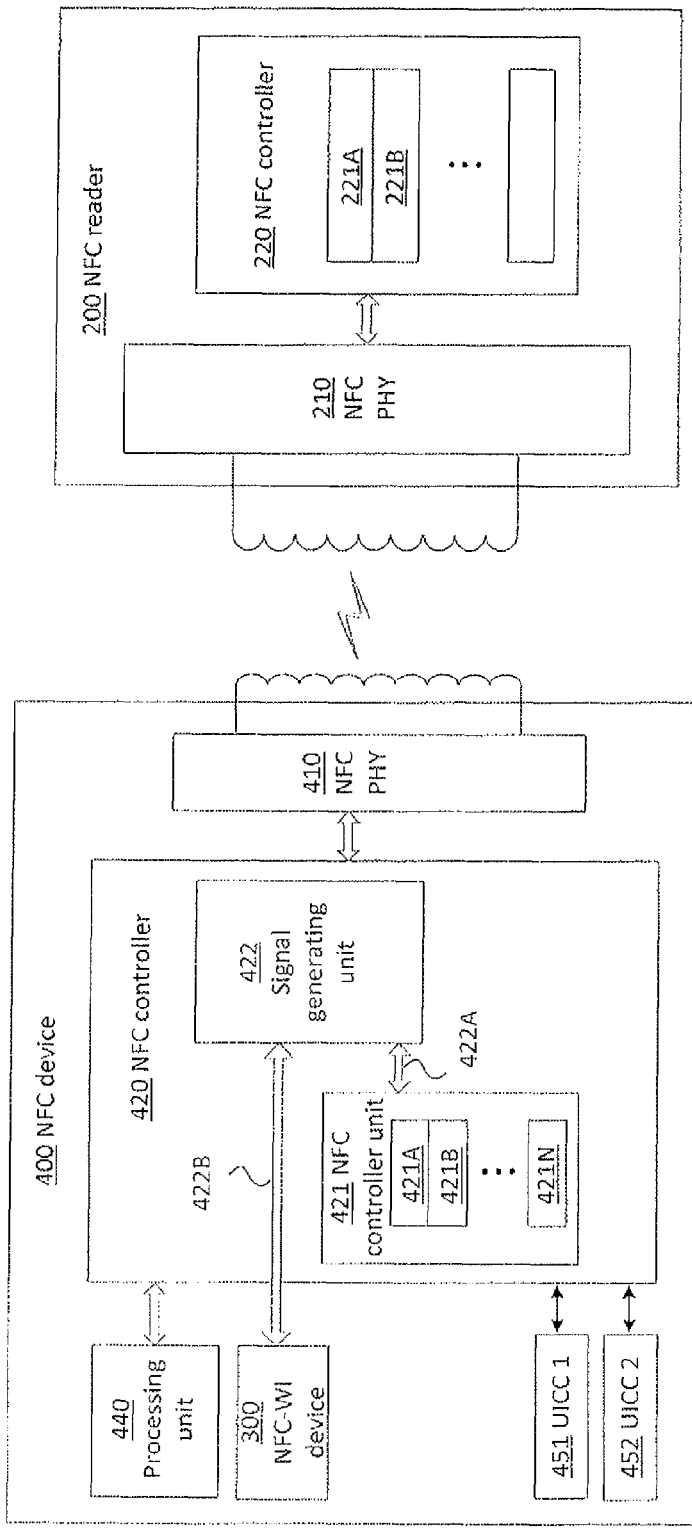
FIG. 3 is a schematic block diagram of embodiments of a signal generating unit comprised in an NFC device and an NFC reader.

FIG. 3 shows a schematic block diagram of embodiments of the NFC device 400 and a NFC reader 200.

The NFC reader 200 comprises a NFC physical interface 210 that is connected to a loop antenna or similar, and a NFC controller 220. The NFC reader 200 may also be referred to as a Proximity Coupling Device (PCD).

The NFC device 400 may comprise an NFC physical interface 410 and an NFC controller 420. The NFC device 400 may, for example, be a Proximity Integrated Circuit Card or Proximity Card (PICC) or an embedded component acting as a logical PICC.

According to one exemplary embodiment, the NFC Device 400 may emulate a Desfire Card based on UICC1 451 with support for Mifare Desfire. Commands received from the NFC reader 200 will then be handled by the NFC Controller unit 421 to the active UICC1 451. In return, the UICC1 451 will generate the responses that will be subsequently scheduled for transmission by the NFC Controller 420.

The NFC device 400 may also comprise a processing unit 440. The processing unit 440 may be the main processor of the NFC device 440, such e.g. the main processor in a mobile phone or terminal. The processing unit 440 may be directly involved in the card emulation process, even when no UICC or NFC-WI is present. The processing unit 440 may also power down, e.g. when the battery is discharged, and the card emulation may be performed based on UICC1 451, UICC2 452 or the NFC-WI device 300. When the processing unit 440 is involved in the card emulation process, the NFC Controller 420 may handle the commands from the NFC reader 200 to the processing unit 440. The processing unit 440 will then generate the responses that will be scheduled for transmission by the NFC Controller 420.

The NFC physical interface 410 is configured to provide for near-field communication with the NFC reader 200, i.e. transmitting and receiving signals to/from the NFC reader 200 via an RF-field. This may be performed via a loop antenna or similar. This means that the NFC physical interface 410 may generate a NFC-RF signal comprising a signal, which NFC-RF signal is detectable by the NFC reader 200. In a passive communication mode, this may be performed by modulating an existing RF field generated by the NFC reader 200. The NFC physical interface 410 is also configured to communicate with the NFC controller 420. In particular, the NFC physical interface 410 is configured to communicate with a signal generating unit 422 in the NFC controller 420.

The NFC controller 420 is configured to communicate with a NFC-WI device 300 that is connected to the NFC device 400 and an NFC controller unit 421 comprised in the NFC controller 420. The NFC controller unit 421 may also be referred to as a Controller Function (CLF). The NFC controller unit (CLF) 421 and the NFC-Wired Interface unit 300 may, for example, be configured for NFC type A, 106 kbps, according to the ISO14443A standard. The NFC controller 420 also comprises a signal generating unit 422.

It should be noted that the NFC Controller 420 may also be described as comprising a number of further units, such as, for example, a Software Protocol (SWP) controller unit, a WI controller unit and an internal processing unit. The SWP Controller may be configured to interface with the UICC1 451 and UICC2 452. The WI controller may be configured to interface with the NFC-WI device 300. The internal processing unit, or processor, may be configured to program the SWP Controller, the WI controller and the controller function (CLF), i.e. NFC controller unit (CLF) 421, in order to ensure data flow therein between. The internal processing unit may also handle communication with the processing unit 440.

As the NFC physical interface 410 receives a polling and/or anti-collision command from the NFC reader 200 and sends it to the NFC controller 420, the NFC controller 420 sends the polling and/or anti-collision command to the NFC controller unit (CLF) 421 and the NFC-Wired Interface unit 300. This may be performed by the NFC controller 420 such that the polling and/or anti-collision command is received at simultaneously, i.e. at the same time, by the NFC controller unit (CLF) 421 and the NFC-Wired Interface unit 300.

The NFC controller unit (CLF) 421 may be configured to support multiple card/device emulations, based on e.g. the Universal Integrated Circuit Card (UICC) enabled cards/devices UICC1 451 and UICC2 452.

Each emulated card/device is represented in the NFC controller unit (CLF) 421 with a Unique Identifier (UID) or Pseudo Unique Proxcard Identifier (PUPI) 421A, 421B, ..., 421 N, respectively. The emulated cards/device may also be referred to as an emulated NFC device or PICC, and are logical PICCs. The NFC Controller unit (CLF) 421 may for the multiple card/device emulations use one or more protocols that are based on the ISO14443A standard, such as, for example, ISO14443-4, ISO18092, etc. This means that the NFC Controller unit (CLF) 421 require and will perform polling, anti-collision and selection procedures as defined in the ISO14443-3 specification.

The NFC controller unit (CLF) 421 is configured to receive polling and/or anti-collision commands originating from the NFC reader 200. In reply to such polling and/or anti-collision commands, the NFC controller unit (CLF) 421 is configured to transmit a first signal. This first signal comprises data encoding information indicating a unique identifier 421A, 421B, ..., 421N that is supported by the NFC controller unit 421, i.e. that represents one of multiple card/device emulations, such as, e.g. the Universal Integrated Circuit Card (UICC) enabled cards/devices UICC1 451 and UICC2 452. The data encoding information in the first signal may, for example, be Manchester encoded using the ISO14443A standard for 106 kbps.

The NFC controller unit (CLF) 421 is configured to communicate with the signal generating unit 422. In particular, the NFC controller unit (CLF) 421 is configured to transmit the first signal to the signal generating unit 422. The first signal is transmitted by the NFC controller unit (CLF) 421 at a certain specified timing, as per requirements in the ISO14443A standard. Thus, the first signal will be sent simultaneous with the second signal from the NFC-WI device 300.

The NFC-Wired Interface unit 300 is connected to the NFC device 400 via a NFC-Wired Interface. The NFC-Wired Interface is described in the ECMA-373 standard. This means that the NFC-WI device 300 has an independent, standalone functionality for card/device emulation. It also means that the NFC-WI device 300 require and will perform polling, anti-collision and selection procedures as defined in the ISO14443-3 specification.

The NFC-WI device 300 is configured to receive polling and/or anti-collision commands from the signal generating unit 422. The polling and/or anti-collision commands may originate from the NFC reader 200. In reply to such polling and/or anti-collision commands, the NFC-WI device 300 is configured to transmit a second signal. This second signal comprises data encoding information indicating a unique identifier that is supported by the NFC-WI device 300, i.e. that represents a card/device emulation in the NFC-WI device 300. The data encoding information in the second signal may, for example, be Manchester encoded using the ISO14443A standard for 106 kbps.

The NFC-WI device 300 is configured to communicate with the signal generating unit 422 over the NFC-Wired Interface, in particular, the NFC-WI device 300 is configured to transmit the second signal to the signal generating unit 422. The second signal is transmitted by the NFC-WI device 300 at a certain specified timing, as per requirements in the ISO14443A standard. Thus, the second signal will be sent simultaneous with the first signal from the NFC controller unit (CLF) 421.

The signal generating unit 422 is configured to communicate with the NFC physical interface 410. Also, the signal generating unit 422 is configured to communicate with the NFC controller unit (CLF) 421, e.g. via the data path 422A as illustrated in FIG. 3. Furthermore, the signal generating unit 422 is also configured to communicate with an NFC-Wired Interface unit 300, e.g. via the data path 422B as illustrated in FIG. 3. The data paths 422A and 422B are separate data paths.

In response to the polling and/or anti-collision command to both the NFC controller unit (CLF) 421 and the NFC-Wired Interface unit 300, the signal generating unit 422 is configured to receive the first signal from the NFC controller unit 421 and the second signal from the NFC-Wired Interface unit 300 simultaneously, or at least substantially simultaneously.

Then, the signal generating unit 422 generates a third signal based on the received first and second signals, i.e. the signal generating unit 422 is configured to generate a third signal based on the received first and second signals. This may be performed with negligible latency from the reception of the first and second signals.

According to some embodiments, since the first and second signal may be coded in the same way, e.g. Manchester coded, the third signal may be generated through a simple signal composition using a logic AND. In other words, the third signal may be generated by using a logical AND operation to combine the digital signals that comprise the first and the second signal, respectively. Since bit values may be identified by specific sequences, such as, e.g. a modulation on the first half of bit duration for a logic "1" and a modulation on the second half of bit duration for a logic "0", a collision may be generated in the NFC reader 200 if the third signal is received with modulation during the entire duration of a bit, i.e. both logic "1" and logic "0". It should be noted that in this case, upon implementation, it may be necessary to take into account potentially reversed polarities of the received first and second signals.

The third signal may then be sent by the signal generating unit 422 to the NFC physical interface 410. In other words, the third signal may be used to drive the input of the NFC physical interface 410. In response to receiving the third signal, the NFC physical interface 410 may generate a NFC-RF signal comprising the third signal. As previously mentioned above, this may be performed by the NFC physical interface by modulating the existing RF field generated by the NFC reader 200.

Thus, whenever there is a difference between the UIDs originating from the NFC-WI device 300 and the NFC card/device emulated and supported by NFC controller unit (CIS) 421, a collision sequence will be created in and detected by the NFC reader 200. The NFC reader 200 will thus become aware of the existence of more than one of an emulated NFC card/device and the NFC-WI device 300, and will follow the ISO14443-3 standardized anti-collision process for selection of a certain NFC card/device or NFC-WI device 300.

Those skilled in the art will also appreciate that the NFC controller 420, the NFC controller unit 421, the signal generating unit 422, the processing unit 440 and the NFC physical interface 410 described above may refer to a combination of analog and digital circuits, and/or one or more processors configured with software and/or firmware, e.g. stored in a memory, that when executed by the one or more processors such as the NFC controller 420 and/or the processing unit 440 perform as described herein. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

It should be noted that the NFC device 400 also comprises the arrangement depicted in FIG. 3 in order to perform the method actions for generating a signal to be used in the NFC reader 200 as described below with reference to FIGS. 4-5.

Embodiments of a method in the NFC device 400 will now be described with reference to the flowchart depicted in FIG. 4. The flowchart in FIG. 4 describes a method in a signal generating unit 422 for generating a signal to be used in a Near-Field Communication, NFC, reader 200. The signal generating unit 422 is comprised in an NFC device 400 and configured to communicate with an NFC controller unit 421 and an NFC-Wired Interface unit 300. The NFC controller unit 421 is comprised in the NFC device 400. The NFC-Wired Interface unit 300 is connected to the NFC device 400.

Figure 4:
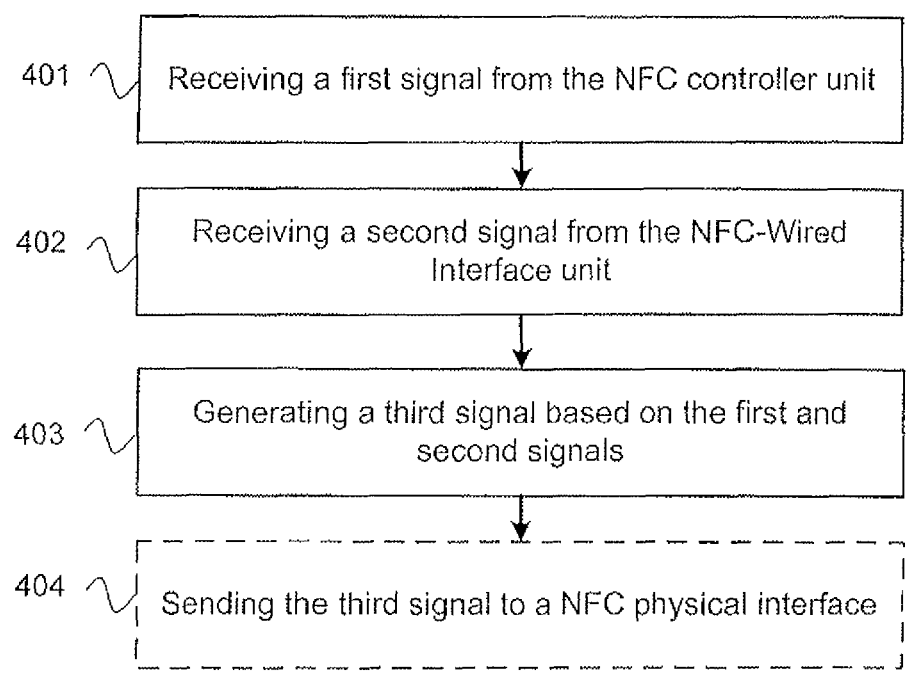
FIG. 4 is a flowchart depicting embodiments of a method in a signal generating unit comprised in an NFC device.

FIG. 4 is an illustrating example of detailed exemplary actions or operations which may be taken by a signal generating unit 422. It should be appreciated that the flowchart diagram is provided merely as an example and that the signal generating unit 422 may be configured to perform any of the exemplary actions or operations provided herein. It should also be appreciated that the actions or operations illustrated below are merely examples, thus it is not necessary for all the actions or operations to be performed. It should further be appreciated that the actions or operations may be performed in any combination. Furthermore, the flowchart in FIG. 4 comprises the following actions, and may also be implemented for any of the above and below mentioned embodiments or in any combination with those.

Action 401

In this action, the signal generating unit 422 receives a first signal from the NFC controller unit 120. This means that the signal generating unit 422 receives a first signal from the NFC controller unit 421, which first signal comprises data encoding information indicating a first unique identifier that is supported by the NFC controller unit 421. The data encoding information in the first signal may, for example, be Manchester encoded using the ISO14443A standard for 106 kbps, e.g. in cases where the NFC controller unit 422 is configured for NFC type A, 106 kbps, according to the ISO14443A standard.

This may also mean that the first signal is received from the NFC controller unit 421 in response to a polling or anti-collision command from the NFC reader 200.

Action 402

In this action, the signal generating unit 422 receives a second signal from the NFC-Wired Interface unit 300. This means the signal generating unit 422 receives a second signal from the NFC-Wired Interface unit 300, which second signal comprises data encoding information indicating a second unique identifier that is supported by the NFC-Wired Interface unit 300. The data encoding information in the second signal may, for example, be Manchester encoded using the ISO14443A standard for 106 kbps, e.g. wherein the NFC-Wired Interface unit 300 is configured for NFC type A, 106 kbps, according to the ISO14443A standard.

This may also mean that the second signal is received from the NFC-Wired Interface unit 300 in response to a polling or anti-collision command from the NFC reader 200.

Action 403

Based on the first and second signals, the signal generating unit 422 generates a third signal. The third signal is to be used in the NFC reader 200 to generate a collision sequence. This may be performed by the signal generating unit 422 by a logical AND operation between the first and the second signal.

Action 404

In some embodiments, the signal generating unit 422 may send the third signal to an NFC physical interface 410 comprised in the NFC device 400. The NFC physical interface 410 may then generate a NFC-RF signal comprising the third signal. This NFC-RF signal is detectable by the NFC reader 200.

Figure 5:
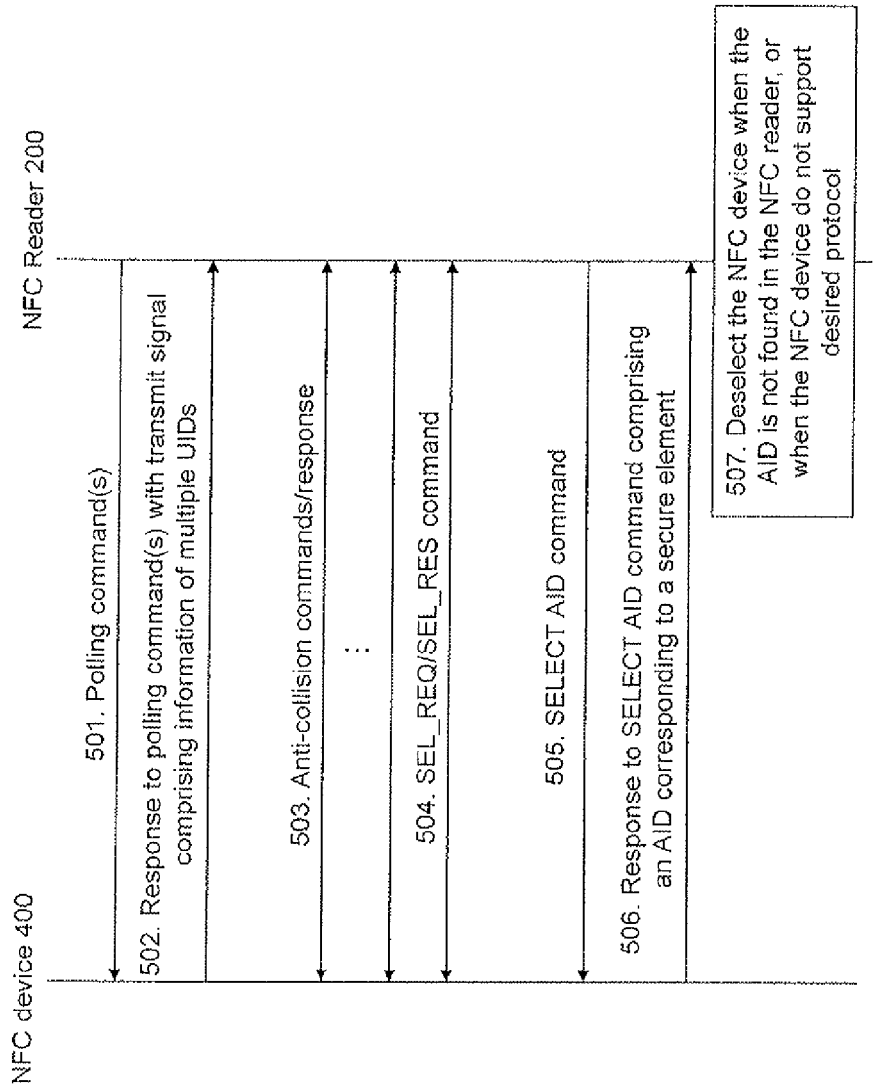
FIG. 5 is a signalling diagram between an NFC device comprising embodiments of a signal generating unit and an NFC reader.

FIG. 5 shows an illustrating example of a signalling diagram between an NFC reader 200 and an NFC device 400 performing a polling, anti-collision and selection procedure. The NFC device 400 comprises any one of the embodiments of the signal generating unit 422 as described above.

FIG. 5 is an illustrating example of detailed exemplary actions or operations which may be taken by a NFC device 400. It should be appreciated that the flowchart diagram is provided merely as an example and that the NFC device 400 may be configured to perform any of the exemplary actions or operations provided herein. It should also be appreciated that the actions or operations illustrated below are merely examples, thus it is not necessary for all the actions or operations to be performed. It should further be appreciated that the actions or operations may be performed in any combination. Furthermore, the flowchart in FIG. 4 comprises the following actions, and may also be implemented for any of the above and below mentioned embodiments or in any combination with those.

Action 501

In this action, the NFC device 400 receives a polling command from the NFC reader 200.

Action 502

The NFC device 400 responds to a polling command by sending the third signal generated by the signal generating unit 422 as described in any one of the embodiments above. This means that a response, i.e. the third signal, comprising information of multiple UIDs with collisions is sent by the NFC device 400. This response emulates a collision in the NFC reader 200 of the two different physical NFC devices in the NFC device 400, i.e. the response comprises both the first signal from the NFC controller unit 120 and the second signal from the NFC-Wired Interface unit 300. For example, the collision may be detected in the NFC reader 200 if the response is received with modulation during the entire duration of a bit, i.e. representing both a logic "1" and a logic "0".

Thus, the response, i.e. the third signal, will create a collision in the NFC reader 200 making the NFC reader 200 aware of the presence of more than one NFC device in the NFC device 400, i.e. the NFC controller unit 120 and the NFC-Wired Interface unit 300. However, it should be noted that the NFC reader 200 becomes aware of the presence of more than one NFC Device in the RF field that it generates, but with no specific information on which of these NFC devices are emulated or are actual physical NFC devices.

Action 503

In this action, the NFC reader 200 sends anti-collision commands to the NFC device 400. The NFC device 400 may send anti-collision responses back to the NFC reader 200. This is performed according to the anti-collision procedure in the standard ISO14443-3.

It should be noted that responses made by the NFC device 400 to further polling commands or to the anti-collision commands may also comprise a collision on one of the subsequent bits, i.e. if there are more than one NFC devices emulated in the NFC device 400.

This also means that the NFC reader 200 may deselect one of the NFC controller unit 120 and the NFC-Wired Interface unit 300 in the NFC device 400 that contributed to the collision. The selecting may e.g. be performed for the bit showing the collision, e.g. a value "0" (or "1") in the response to the anti-collision command, which response is the third signal.

Action 504

At the end of the anti-collision procedure according to the standard ISO14443-3, the NFC device 400 may send a SEL_REQ command. This SEL_REQ command indicates which of the NFC devices present in the RE field of the NFC reader 200 will be further addressed by higher-layer protocol commands. Thus, the SEL_REQ command selects an NFC device among the NFC devices at the end of the anti-collision procedure. The NFC device 400 may respond to the SEL_REQ command with a SEL_RES command.

Action 505

After the anti-collision procedure has completed, the NFC reader 200 may send a SELECT AID command to the NFC device 400 according to the ISO7816 standard. This is performed using a higher level data transport protocol, and used to select a certain Application ID (AID). It should be noted that in a physical NFC device there may be multiple AIDs. This SELECT AID command may be sent after the anti-collision procedure has completed and after the protocol initialization command, for example, as per the ISO14443-4/NFC Forum Digital Protocol ISO-DEP standard.

Action 506

The NFC device 400 may respond with a response according to the ISO7816 standard. The response may comprise an Application ID (AID) corresponding to the secure element of the selected NFC device in the NFC device 400.

Action 507

As part of the standard ISO14443 procedure, the NFC reader 200 may then also deselect a selected NFC device in the NFC device 400 based on, for example, that the AID of the selected NFC device does not match the AID targeted by the NFC reader 200 or if the AID of the selected NFC device does not support the desired protocol of the targeted AID.

For example, if the NFC reader 200 finds that the AID of the selected NFC device does not match the AID targeted by the NFC reader 200 or the response from the NFC device 400 is an error code showing that the target AID sent in the SELECT command is not supported, the NFC reader 200 will deselect the selected NFC device and may repeat the polling and anti-collision procedure. The selected NFC device may then not respond to the next polling, since it may be in a SLEEP state due to deselect of the NFC reader 200. Alternatively, the NFC reader 200 may remember the UID and avoid selecting it in this next anti-collision procedure. Thus, the NFC reader 200 may be able to check other NFC devices for an AID match.

An advantage of the embodiments presented herein is also that the resultant identification process of NFC devices, such as, the NFC controller unit 120 and the NFC-Wired Interface unit 300 in the NFC device 400, in a NFC reader 200 is faster and more deterministic in comparison to the conventional identification process of NFC devices in the NFC reader 200.

The embodiments herein are not limited to the above described preferred embodiments. Various alternatives, modifications and equivalents may be used. Therefore, the above embodiments should not be construed as limiting.

ABBREVIATIONS

AID Application ID
CLF Controller Function
NFC Near-Field Communication
NFC-RF NFC-Radio Frequency
NFC-WI NFC-Wired Interface
NFC-CLF NFC-Controller Function
SW Ctrl MUX Software Controlled Multiplexer
SWP Software Protocol
PCD Proximity Coupling Device
PICC Proximity Integrated Circuit Card or Proximity Card
UICC Universal Integrated Circuit Card
UID Unique Identifier
PUPI Pseudo Unique Proxcard Identifier
WI Wired Interface

The invention claimed is:

1. A method in a signal generating unit for generating a signal to be used in a Near-Field Communication (NFC) reader, the method comprising:

receiving, by the signal generating unit, a first signal from a Near-Field Communication (NFC) controller unit, the first signal including first data encoding information indicating a first unique identifier that is supported by the NFC controller unit, the signal generating unit being included in an NFC device and configured to communicate with the NFC controller unit and an NFC-Wired Interface unit, the NFC controller unit being included in the NFC device, and the NFC-Wired Interface unit being connected to the NFC device;

receiving, by the signal generating unit, a second signal from the NFC-Wired Interface unit, the second signal including second data encoding information indicating a second unique identifier that is supported by the NFC-Wired Interface unit; and generating, by the signal generating unit, a third signal by combining the first signal and the second signal, wherein the third signal is to be used in the NFC reader to generate a collision sequence, wherein the NFC controller unit emulates a card or device assigned the first unique identifier and performs polling, anti-collision, and selection procedures, and wherein the NFC-Wired Interface unit has an independent, standalone functionality for card or device emulation, which includes performing polling, anti-collision, and selection procedures.

2. The method according to claim 1, further comprising:
sending the third signal to an NFC physical interface in the NFC device, wherein the NFC physical interface generates a NFC-RF signal comprising the third signal, the NFC-RF signal being detectable by the NFC reader.

3. The method according to claim 1, wherein the combining of the first and second signals to generate the third signal comprises a logical AND operation between the first and the second signal.

4. The method according to claim 1, wherein the first signal is received from the NFC controller unit in response to a polling or anti-collision command from the NFC reader.

5. The method according to claim 1, wherein the second signal is received from the NFC-Wired Interface unit in response to a polling or anti-collision command from the NFC reader.

6. The method according to claim 1, wherein the NFC controller unit and the NFC-Wired Interface unit are configured for NFC type A, 106 kbps, according to the ISO14443A standard, and the data encoding information in the first and second signals are both Manchester encoded using the ISO14443A standard for 106 kbps.

7. A signal generating unit for generating a signal to be used in an Near-Field Communication (NFC) reader, the signal generating unit being configured to:
communicate with an NFC controller unit and an NFC-Wired Interface unit, the signal generating unit and the NFC controller unit being included in an NFC device and the NFC-Wired Interface unit being connected to the NFC device,
receive a first signal from the NFC controller unit, the first signal including first data encoding information indicating a first unique identifier that is supported by the NFC controller unit,
receive a second signal from the NFC-Wired Interface unit, the second signal including second data encoding information indicating a second unique identifier that is supported by the NFC-Wired Interface unit, and
generate a third signal by combining the first signal and the second signal, wherein the third signal is to be used in the NFC reader to generate a collision sequence,
wherein the NFC controller unit emulates a card or device assigned the first unique identifier and performs polling, anti-collision, and selection procedures, and
wherein the NFC-Wired Interface unit has an independent, standalone functionality for card or device emulation, which includes performing polling, anti-collision, and selection procedures.

8. The signal generating unit according to claim 7, further configured to send the third signal to a NFC physical interface in the NFC device, wherein the NFC physical interface is configured to generate a NFC-RF signal comprising the third signal, the NFC-RF signal being detectable by the NFC reader.

9. The signal generating unit according to claim 7, wherein the combining to generate the third signal comprises a logical AND operation between the first and the second signal.

10. The signal generating unit according to claim 7, wherein the NFC controller unit and the NFC-Wired Interface unit are configured for NFC type A, 106 kbps, according to the ISO14443A standard, and the data encoding information in the first and second signals are both Manchester encoded using the ISO14443A standard for 106 kbps.

11. A Near-Field Communication (NFC) device configured to be connected to an NFC-Wired Interface unit, the NFC device comprising an NFC controller, which NFC controller comprises an NFC controller unit and a signal generating unit according to claim 7.

* * * * *